US008204834B2

(12) United States Patent
Racanelli et al.

(10) Patent No.: US 8,204,834 B2
(45) Date of Patent: Jun. 19, 2012

(54) ESTATE DISPOSITION MODELING

(75) Inventors: Janine A. Racanelli, Bellerose Village, NY (US); Tina D. Millligan, Evanston, IL (US); Martin W. Siow, New York, NY (US); Ramy F. El-Menshawy, Hoboken, NJ (US); Ryan D. Toben, New York, NY (US); Lauren Anderson, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 756 days.

(21) Appl. No.: 12/205,473

(22) Filed: Sep. 5, 2008

(65) Prior Publication Data

US 2010/0063908 A1 Mar. 11, 2010

(51) Int. Cl.
 *G06Q 50/00* (2012.01)
(52) U.S. Cl. ....................................... 705/312
(58) Field of Classification Search ............ 705/31, 705/1.1, 312
 See application file for complete search history.

(56) References Cited

U.S. PATENT DOCUMENTS

| | | | |
|---|---|---|---|
| 7,203,661 B1 | 4/2007 | Graff | |
| 7,386,496 B1 * | 6/2008 | Braun et al. | 705/36 R |
| 7,454,379 B1 * | 11/2008 | Wolzenski et al. | 705/37 |
| 7,693,765 B2 * | 4/2010 | Dell Orfano | 705/35 |
| 2001/0042034 A1 * | 11/2001 | Elliott | 705/35 |
| 2002/0046144 A1 * | 4/2002 | Graff | 705/36 |
| 2006/0116952 A1 * | 6/2006 | Orfano | 705/38 |
| 2006/0293985 A1 * | 12/2006 | Lederman et al. | 705/35 |
| 2007/0088581 A1 | 4/2007 | Treacy, Jr. | |
| 2007/0136185 A1 | 6/2007 | Jung et al. | |
| 2007/0192114 A1 | 8/2007 | Parpala | |
| 2007/0208646 A1 | 9/2007 | Treacy, Jr. | |
| 2007/0299683 A1 * | 12/2007 | Elliott | 705/1 |
| 2009/0030825 A1 * | 1/2009 | Nilson | 705/35 |
| 2010/0198714 A1 * | 8/2010 | Orfano | |

OTHER PUBLICATIONS

Mark Segal, "IRS Attacks Asset Transfers Designed to Thwart Tax Collection", Practical Tax Strategies, v. 80, pp: 78-83.*
International Search Report; International Application No. PCT/US 09/56049 filed Sep. 4, 2009.

* cited by examiner

*Primary Examiner* — Matthew Gart
*Assistant Examiner* — Seye Iwarere
(74) *Attorney, Agent, or Firm* — Goodwin Procter LLP

(57) ABSTRACT

A system and computer-implemented method for modeling estate disposition are disclosed. One embodiment receives balance sheet inputs, estate planning document inputs and timing/event inputs. Conveyance and tax logic are applied to the inputs. Flowcharts illustrating the disposition of the estate based on the inputs are generated. Tax and liquidity analysis based on the inputs are also generated.

4 Claims, 16 Drawing Sheets

Estimated Estate Disposition for Spouse1 (Spouse2 surviving) — 597

Step 1: Distributions to the Estate/Marital Trust

561 {
- Gross Estate — $10,000,000
- Less:
  - Estate Exemption — 2,000,000
  - Taxable Bequests — 0
  - Charitable Bequests — 0
  - Debts/Expenses — 0
  - Federal Estate Tax — 0
  - State Estate Tax — $107,391
- Net Residue — $7,892,609
- Marital Share — 100%
- Charitable Share — 0%
- Marital Deduction — $7,892,609

563

Step 2: Estate Tax Calculation

- Gross Estate — $10,000,000
- Less:
  - Charitable Bequests — 0
  - Marital Deduction — 7,892,609
  - Debts/Expenses — 0
  - State Estate Tax — $107,391
- Federal Taxable Estate — $2,000,000
- Less: Estate Tax Bracket Floor — (2,000,000)
- Excess — 0
- Marginal Estate Tax Rate — 45%
- Federal Estate Tax — $0

565 {
- Federal Estate Tax — $0
- State Estate Tax — 107,391
- Total Estate Tax — $107,391

Estimated Estate Disposition for Spouse2 (having survived Spouse1) — 599

Step 1: Distributions to the Estate

571 {
- Gross Estate — $7,892,609
- Less:
  - Estate Exemption — 2,000,000
  - Taxable Bequests — 0
  - Charitable Bequests — 0
  - Debts/Expenses — 0
  - State Estate Tax — $758,595
- Net Residue — $5,134,014
- Children/Taxable Share — 100%
- Charitable Share — 0%
- Children/Taxable Residuary — $5,134,014

573

Step 2: Estate Tax Calculation

- Gross Estate — $7,892,609
- Less:
  - Charitable Bequests — 0
  - Debts/Expenses — 0
  - State Estate Tax — $758,595
- Federal Taxable Estate — $7,134,014
- Less: Estate Tax Bracket Floor — (2,000,000)
- Excess — 5,134,014
- Marginal Estate Tax Rate — 45%
- Federal Estate Tax — $2,310,306

575 {
- Federal Estate Tax — $2,310,306
- State Estate Tax — 758,595
- Total Estate Tax — $3,068,901

Figure 11A

Combined Cash requirements of both estates

| | |
|---|---|
| Administration expenses: | (1,436,115) |
| Debts: | (1,500,000) |
| Estate taxes | (31,868,211) |
| Income taxes*: | (591,788) |
| Total cash required | (35,396,113) |

Combined Liquidity available to both estates

| | |
|---|---|
| Cash: | 10,500 |
| Marketable securities: | 4,050,000 |
| Concentrated assets: | 4,800,000 |
| RSUs**: | 1,500,000 |
| Life insurance: | 1,500,000 |
| Qualified Assets: | 600,000 |
| Total cash required | 12,460,500 |

Estimated liquidy deficit

(22,935,613)

* Does not include income taxes payable upon exercise of options & distribution of qualified assets
** Does not include stock options, since rather than exercise these immediately the executor may instead choose to take advantage of any remaining time to expiry

Figure 11B

Combined Cash requirements of both estates

| | |
|---|---|
| Administration expenses: | (3,793,126) |
| Debts: | (1,000,000) |
| Estate taxes | (70,675,178) |
| Income taxes*: | (576,796) |
| Total cash required | (76,045,099) |

Combined Liquidity available to both estates

| | |
|---|---|
| Cash: | 5,900,000 |
| Marketable securities: | 41,400,000 |
| Concentrated assets: | 400,000 |
| RSUs**: | 2,000,000 |
| Life insurance: | 3,000,000 |
| Total cash required | 52,700,000 |

Estimated liquidy deficit

(23,345,899)

* Does not include income taxes payable upon exercise of options & distribution of qualified assets
** Does not include stock options, since rather than exercise these immediately the executor may instead choose to take advantage of any remaining time to expiry

ESTATE DISPOSITION MODELING

BACKGROUND

Estate planning is a complicated process fraught with uncertainty introduced by the unpredictability of personal health and safety, financial markets and the law over time. The complexity is made more severe for larger estates that typically hold a wide variety of assets, utilize more sophisticated tax advantaged or exempt structures, have liabilities to many different parties, and involve a large number of beneficiaries. Especially in the case of these larger or more complex estates, the final disposition of an estate is highly vulnerable to changes in the taxation of estate assets, gifts and income.

Different types of assets experience different tax treatment when transfers are made upon a person's death. Further, the application of taxes to estates has been, and likely will remain, in flux. For example, the federal estate tax exemption levels are mandated to rise to $3.5 million by 2009 and to fall to just $1 million in 2011. In 2010, the federal estate tax is completely repealed. Other taxes, such as the gift tax, the Generation-Skipping Transfer Tax (GSTT) and income tax may also be paid out of the estate upon disposition of its assets to beneficiaries. As Congress and state governments adjust the tax codes to evolving public sentiment and changing fiscal needs, these exogenous legal and policy factors further complicate the inherent endogenous uncertainties in predicting or projecting the impact of a death or deaths on the financial well-being of heirs and other beneficiaries.

In view of these taxes, estate planners have utilized a multitude of legal structures such as trusts to reduce or minimize estate, death or income taxes. More complicated or expansive estates typically require more individualized attention from wealth advisors and estate planners to accomplish the client's estate planning objectives. As the estate plans become more complex, planners and clients alike have struggled to clearly understand the structure and eventual implications of their estate planning documents on their assets and heirs/beneficiaries. Conventional estate document generation software such as Quicken WillMaker assists users in generating documents such as wills and trusts. These document generation software solutions, however, do not provide a client with a comprehensive view of the eventual financial impact of the documents being generated. Previously, wealth advisors had to draw flowcharts by hand or expend significant effort to use generic flowcharting software such as Microsoft PowerPoint or Visio.

The prior art solutions have several drawbacks which limit their use to estate planners, wealth advisors, and their clients. For example, conventional solutions include Estate Planning QuickView by Leimberg Associates, generates rudimentary charts and graphs based on a client's assets and general provisions in the client's will or trust documents. QuickView and similar programs, however, lack the flexibility and extensibility required to adequately plan and manage the disposition of complex estates. In particular, these prior art solutions fail to combine and reconcile the complex tax analysis required for these estates and the need for a clear visual depiction of the estate at ultimate disposition and intermediate points of time therein. These programs also do not estimate potential liquidity deficits upon final disposition of an estate, which deficits can create enormous tax liabilities for beneficiaries the deceased intended to care for.

Accordingly, in view of the deficiencies in the prior art, several industry needs have been recognized by the inventors. First, there is a need for improved and customizable graphical visualization tools to communicate the intricate flow of assets and liabilities to different entities over time, where this tool receives a variety of inputs related to the estate's assets, liabilities and estate planning instructions. Second, there is a need to project or estimate tax implications related to the estate's assets and estate plan, including identification of a potential for the estate to experience a liquidity deficit or shortfall. Third, there is a need to clearly reconcile and combine the tax implications of a complex estate plan with a clear visual depiction of the estate's disposition at a future time.

BRIEF SUMMARY

In one aspect, a computer-implemented method for modeling a disposition of an estate includes receiving balance sheet inputs for a first individual, the balance sheet inputs including an asset and asset value information, receiving event inputs associated with the first conveyance event, receiving first estate document inputs for the first individual, the estate document inputs including a first conveyance instruction associating the asset and a first beneficiary, the conveyance instruction corresponding to the first conveyance event, estimating a first tax liability value associated with the asset, the first tax liability corresponding to the first conveyance instruction and the first conveyance event, comparing the first tax liability value to the asset value information to generate a liquidity analysis report corresponding to the first conveyance event, and generating a first flowchart corresponding to the first conveyance event, the first flowchart visually representing the first conveyance instruction. One embodiment further includes receiving balance sheet inputs for a second individual, receiving an indication of a second conveyance event, receiving second estate document inputs for the second individual, the estate document inputs including a second conveyance instruction corresponding to the second conveyance event, estimating a second tax liability value corresponding to the second conveyance instruction and the second conveyance event, and generating a second flowchart corresponding to the second conveyance event, the second flowchart visually representing the second conveyance instruction, wherein the liquidity analysis report corresponds to the first and second conveyance events.

In another aspect, a computer-implemented method for modeling a disposition of an estate includes receiving balance sheet information including asset information and liability information for an estate, receiving first estate planning document information including a first conveyance instruction associating the asset information and the liability information with a first beneficiary, receiving a first conveyance event corresponding to the first conveyance instruction, generating a first taxation estimate based on the first conveyance instruction and a corresponding first taxation rate, generating an estate cash requirements estimate and an estate cash available estimate of the estate based on the first taxation estimate, comparing the first estate cash requirements estimate and the first estate cash available estimate to generate an estate liquidity analysis report corresponding to the first conveyance event, and applying the first conveyance instruction and the first taxation estimate to the balance sheet information to generate a first disposition flowchart visually depicting the disposition of the asset information and liability information after the first conveyance event, the first flowchart indicating a portion of the asset information conveyed to the first beneficiary. One embodiment further includes receiving second estate planning document information including a second conveyance instruction associating the asset information and the liability information with a second beneficiary, receiving a second conveyance event corresponding to the second conveyance instruction, generating a second taxation estimate based on the second conveyance instruction and a corresponding second taxation rate, and applying the second conveyance instruction and the second taxation estimate to the balance sheet information to generate a second disposition flowchart visually depicting the disposition of the asset information and liability information after the second conveyance event, the second flowchart indicating a portion of the asset information conveyed to the second beneficiary, wherein the estate cash requirements estimate and the estate cash available estimate are based on the first and second taxation estimates, and the estate liquidity analysis report corresponds to the first and second conveyance events.

In yet another aspect, a system for modeling a disposition of an estate includes a memory configured to store (i) balance sheet information including asset information and liability information for an estate, (ii) first estate planning document information including at least one first conveyance instruction associating at least one of the asset information and the liability information with a first beneficiary, (iii) second estate planning document information including at least one second conveyance instruction associating at least one of the asset information and the liability information with a second beneficiary, (iv) first tax information including a first tax rate associated with the at least one first conveyance instruction, the conveyance instruction corresponding to a first conveyance event, and (v) second tax information including a second tax rate associated with the at least one second conveyance instruction, the conveyance instruction corresponding to a second conveyance event, and a processor configured to (i) estimate the cash requirements of the estate based on the first and second conveyance events, the cash requirements including estate and income tax liabilities, (ii) estimate the cash available to the estate based on the first and second conveyance events, the cash available corresponding to the balance sheet information and the first and second tax rates, (iii) generate a liquidity analysis report comparing the cash requirements and the cash available, and (iv) apply the first and second conveyance instructions and the first and second tax rates to the balance sheet information to generate a customizable graphical flowchart reflecting a disposition of the estate after the second conveyance event.

BRIEF DESCRIPTION OF THE FIGURES

The foregoing discussion will be understood more readily from the following detailed description when considered with the accompanying drawings, wherein

FIG. 3 illustrates a balance sheet inputs interface according to a disclosed embodiment;

FIG. 4 illustrates a first estate document inputs interface according to a disclosed embodiment;

FIG. 5A illustrates a second estate document inputs interface according to a disclosed embodiment;

FIG. 5B illustrates a graphical example of taxation logic according to a disclosed embodiment;

FIG. 11A illustrates a first liquidity status output according to a disclosed embodiment;

FIG. 11B illustrates a second liquidity status output according to a disclosed embodiment;

DETAILED DESCRIPTION

Various disclosed embodiments are generally directed to a system and computer-implemented method of modeling estate disposition.

Figure 1:
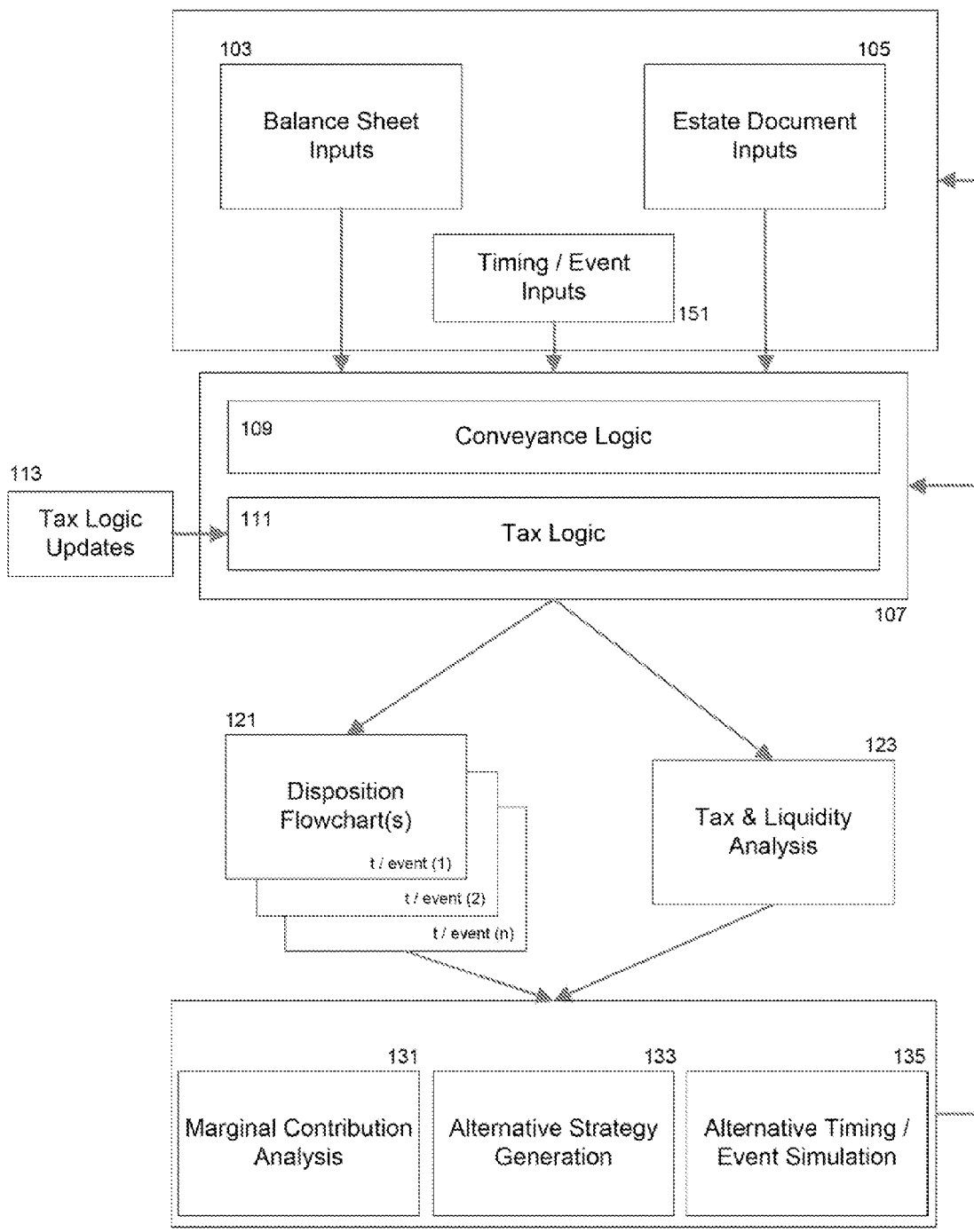
FIG. 1 illustrates a schematic system diagram according to a disclosed embodiment.

FIG. 1 illustrates a schematic diagram according to a disclosed embodiment. Generally, various disclosed embodiments receive balance sheet 103 and estate document inputs 105 corresponding to an estate planning client, apply conveyance 109, taxation 111 and other 107 logic to the client's inputs to generate one or more customizable disposition flowcharts 121 visually depicting the flow of estate components to beneficiaries and/or an estimate of the estate's future liquidity status 123. Taxation logic includes information associating what assets are taxed, the extent to which these assets are taxed, under what conditions the tax is applied, and how the tax is applied. Taxation logic includes rules associated with the relevant federal and state tax codes. In one embodiment, timing or event inputs 151 allow for the projection of estate disposition and tax events for a wide range of circumstances, including, but not limited to, the absolute and relative timing of the deaths of the client and/or spouse. For example, the death of the client might occur in 10 years, and the death of the surviving spouse 15 years beyond then. Alternatively, the client's spouse might die before the client. Variation in the present and future taxation schemes and timing of deaths has implications on the taxation calculations in the present or future time periods accommodated by the model. For example, the death of a client and/or spouse in 2008 implicates a different set of tax rules than the same event or death in 2009. In another embodiment, taxation logic updates 113 correspond to amendments or revisions to the federal and state tax codes, as well as proposed, projected or estimated changes in the federal or state tax code in future years.

In another embodiment, the marginal contribution of a particular conveyance to the estate's overall estate, income or tax liability is estimated 131. For example, after estimating the total tax liability or liquidity shortfall upon disposition of the estate, the model estimates a marginal contribution of a particular asset, liability or conveyance thereof to the overall tax liability or liquidity shortfall. This marginal contribution can then be compared to the overall tax liability for the estate to advantageously allow for easier identification of problematic or "expensive" asset allocations, conveyances or gifts in the current estate plan.

In yet another embodiment, alternative or additional estate planning strategies may be identified and tested in the model 133. For example, based on the estimated component tax liability of a particular conveyance 131, the system may generate possible alternative conveyances (for example, bequeathing an asset to a different beneficiary or establishing a living trust to hold particular assets). A differential of resultant estate tax liability may be estimated for the various alternatives and compared to the current or base scenario. Based on this comparison involving various if-then calculations, a recommendation of one or more of the gifting alternatives may be generated. Alternatively or in combination, the benefits and disadvantages of each of the evaluated alternatives in view of the current conveyance may be displayed to the user or estate planner.

In an additional embodiment, the model provides simulations 135 of alternative events, event timing and other changes in circumstances impacting the estate. For example, this embodiment allows for comparison of the estate disposition analysis based upon different absolute or relative timing in the deaths of the client and spouse. This embodiment advantageously involves projecting the value of the estate at a future time to show the impact of various longer term strategies. Alternatively or in addition to the marginal contribution and alternative planning embodiments described above, this embodiment may allow for a comparison among different planning strategies and also how these different planning strategies fare under different circumstances.

Figure 2:
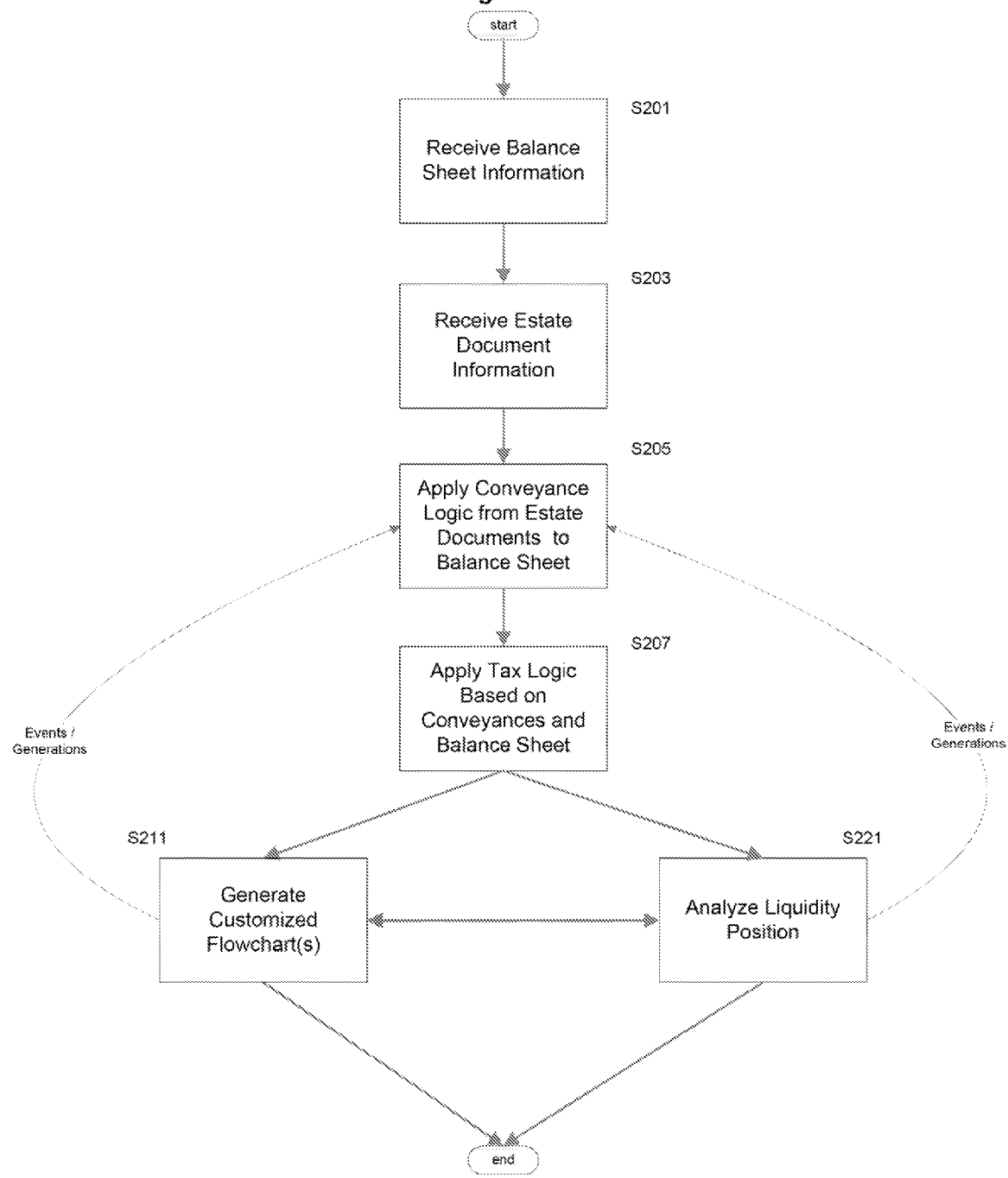
FIG. 2 illustrates a flowchart representing an exemplary method for modeling estate disposition.

FIG. 2 illustrates a flowchart representing an exemplary method for modeling estate disposition. In one embodiment, balance sheet inputs are received S201. Estate document inputs are also received S203. The conveyance logic contained within the estate documents is applied to the balance sheet and estate document inputs S205. Application of the conveyance logic ascertains which assets, or portions thereof, from the client's balance sheet are conveyed to a particular spouse, child or other beneficiary. Additionally, tax logic, such as applicable federal and state income, death, estate, state specific inheritance taxes, and gift taxes, are applied S207. Application of the tax logic ascertains how much of the gross estate is actually conveyed to the intended beneficiaries. Upon applying this logic, a disposition flowchart representing the flow of assets among parties or financial entities is generated S211. Alternatively or in combination with the disposition flowchart, the projected liquidity status of the estate is estimated S221. Additional iterations of the disposition flowcharts, tax estimates and liquidity analysis may optionally be performed based upon subsequent events or changes in circumstances (for example, the death of a spouse or other beneficiary) or for multiple generations of conveyances (for example, to model the estate disposition after the death of children and grand-children).

Figure 3:
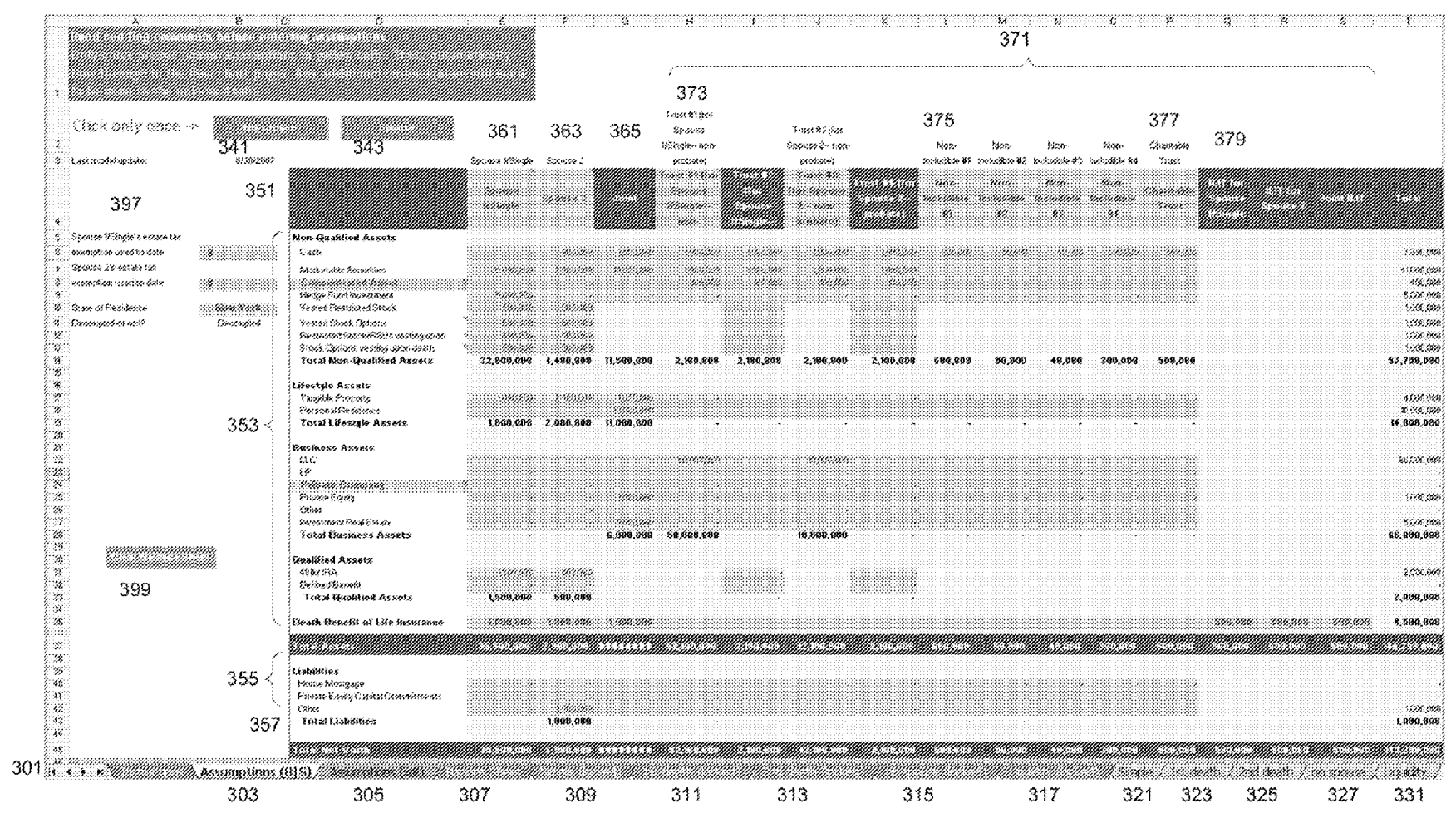

FIG. 3 illustrates a balance sheet inputs interface according to a disclosed embodiment. The balance sheet inputs interface provides a framework for how asset and liability values are taxed and treated by the model. In the illustrated example, the balance sheet inputs interface receives asset information including asset types, values and how these assets are held (including, but not limited to, whether an asset is held outright by the client, outright by the spouse, jointly or in common, in trust, or by others). Liability information is also received. A navigation bar 301 is optionally provided to allow for easy and intuitive transitions among the various input and output interfaces. These interfaces include, but are not limited to, a balance sheet input tab 303, an estate document input tab 305, a balance sheet 307, a combined conveyance tab 321, a first event conveyance flowchart tab 323, a second event conveyance flowchart tab 325, a no-spouse conveyance flowchart tab 325, and a liquidity analysis tab 331. In one embodiment, the balance sheet tab 307 reflects balance sheet information which can be easily modified and formatted for presentation to a client. In case a user makes an error in customizing a flowchart or gets confused, non-customizable or locked versions of the various output tabs are optionally be provided 309, 311, 313, 315, 317.

Balance sheet inputs 351 may include, but are not limited to, a listing of an individual's or an estate's assets 353 and liabilities 355, as well as how these assets and liabilities are held 361, 363, 365, 371. In the illustrated example, the total net worth 357 is also reflected. The difference between the total assets and total liabilities represents the client's or estate's net worth. Assets and liabilities may be categorized based upon shared characteristics such as, for example, estate or income tax treatment or other legal treatment. Examples of categories of assets include, but are not limited to, non-qualified assets, lifestyle assets, business assets and qualified assets. Death benefits of life insurance may also be included.

Examples of non-qualified assets include, but are not limited to, cash, marketable securities (such as stock, bond or other liquid holdings), concentrated assets (such as a high concentration of liquid assets like company stock from stock grants), hedge fund holdings, vested restricted stock, vested stock options, restricted stock units (RSUs) vesting upon death, and stock options vesting upon death. Examples of lifestyle assets include, but are not limited to, tangible property (such as jewelry, art, collectibles, cars, etc.) and personal residence real estate. Examples of business assets include, but are not limited to, investment real estate and LLC, LP, private company, private equity holdings, or portions thereof. Examples of qualified assets include, but are not limited to, insurance policies (whole life, universal and annuities), individual retirement plan holdings (such as 401(k), 403(b), and Independent Retirement Accounts (IRAs)) and defined benefit or pension plans. Balance sheet inputs may also include various assets held in trust.

Examples of liabilities include, but are not limited to, home mortgages, home equity loans, educational loans, consumer loans, other outstanding loans, credit card balances, unpaid taxes and private equity capital commitments. The various balance sheet categories and specific assets and liabilities can be added, modified and removed as required to appropriately reflect the client's actual, hypothetical or estimated estate.

Balance sheet inputs may also include information relating to the members of the estate, such as the name, citizenship and age for the estate planning client, spouse, children and other relatives or beneficiaries. In addition or in the alternative, biographical information such as family composition information can be drawn from the estate documents. Other relevant inputs include the marital status and history of the estate planning client, spouse, children and other beneficiaries. In the illustrated example, action buttons 341, 343 allow for easy input of the client's marital status. Additional relevant inputs includes the state of residence or domicile for tax purposes. The state or residence of the client or couple affects application of estate and other taxes to the estate. In the illustrated example, such information may be added in input fields 397 on the balance sheet input interface. For example, states differ in their treatment of community or joint property and the dynamics of ownership between spouses upon death or divorce. Additionally, the state may have a decoupled estate tax schedule or variation thereon. Certain states also do not apply a death tax to an estate. Another relevant input includes the amount of estate tax exemption used to date by the client and/or spouse. This information may be listed, for instance, on a recent gift tax return (IRS Form 709).

In the illustrated embodiment, the balance sheet inputs include assets and liabilities held by the client him-/herself 361, the client's spouse 363 (if applicable), jointly 365, or in various types of trusts 371. As illustrated, these inputs are provided intuitively as a set of columns in relation to the listing of assets 353 and liabilities 355 in rows. Alternatively, pull-down menus may be used to denote who holds a particular asset or liability. In yet another alternative, separate balance sheet input interfaces may be provided for each spouse or holding entity. Any number and type of trusts can be accommodated by addition, deletion or modification to match or approximate the client's actual or hypothetical estate holdings. For example, the trusts can be for either spouse 373, probate or non-probate, non-includable 375, charitable 377 or related to life insurance 379 (such as an irrevocable life insurance trust (ILIT)).

In the illustrated example, the "Spouse 1/Single" column includes assets in all accounts held by the client, Spouse 1/Single, outright and not in trust. Similarly, the Spouse 2 column includes assets in all accounts held by the client's spouse outright. "Joint" includes assets held jointly by Spouse 1 and Spouse 2. "Trust #1 (for Spouse 1/Single—non-probate)" includes any trust assets that are considered non-probate in the client's estate (revocable trusts, some irrevocable trusts). "Trust #2 (for Spouse 1/Single—probate)" includes assets that are considered probate in the client's estate (outstanding Grantor Retained Annuity Trusts (GRATs)). "Trust #3 (for Spouse 2—non-probate)" includes assets that are considered non-probate in the client's spouse's estate (revocable trusts, some irrevocable trusts). "Trust #4 (for Spouse 2—probate)" includes assets that are considered probate in Spouse 2's estate (outstanding GRATs). "Non-Includible #1", "Non-Includible #2", "Non-Includible #3", and "Non-Includible #4" includes trust assets that may not actually be part of the taxable estate (for example, children's trusts, dynasty trusts they were beneficiaries to). "Charitable Trust" includes any charitable foundations or trusts that client owns. "ILIT for Spouse 1" includes the death benefit to all insurance policies owned by the client in an Irrevocable Life Insurance Trust (ILIT). Policies must be payable upon Spouse 1's death (i.e. single life policies). "ILIT for Spouse 2" includes the death benefit to all insurance policies owned by the client's spouse in an ILIT. Policies must be payable upon Spouse 2's death (i.e. single life policies). "Joint ILIT" includes the death benefit to all survivorship insurance policies owned by both spouses held in an ILIT payable on the second spouse's death.

As described throughout, the various assets may be taxed differently depending on the type of asset or the holder of the asset. Accordingly, in one embodiment, the various asset and liability inputs are associated with a tax treatment parameter associating the asset or liability (or portion of the value thereof) with a particular tax treatment under federal or state tax codes as embodied in the taxation logic. For example, vested restricted stock, vested stock options, RSUs vesting upon death and deferred compensation are considered income in respect of a decedent (IRD) assets, which means there will be an income tax event upon the client's death as long as the assets are not going to charity. In another example, certain qualified assets such as 401k and IRA assets (not Roth) may be considered IRD and assume that there is a lump sum distribution and tax event upon death of the holder. However, if the asset is passed to the spouse (for instance, if the spouse is listed as the primary beneficiary through a payable-on-death provision), the assets are taxed only upon the second spouse's death. The tax treatment parameter includes or operates in conjunction with a holder tax parameter related to the tax treatment of the asset or liability based upon the holder of the asset or liability. For example, different levels or types of tax may be applied to a conveyed asset in the case of a grandchild beneficiary or based on the income of the beneficiary in the year the conveyance is made.

Balance sheet inputs may be retrieved from a variety of tangible or electronic records including, but not limited to, bank statements, investment account statements, mortgage documents, deeds, titles, certificates, and stock option plan agreements. These records may also reflect the form of ownership (sole, joint, etc.) and the list of beneficiaries under certain plans (such as a 401(k) or life insurance). In one embodiment, these inputs are entered manually by, for example, an estate planner or wealth advisor upon a review of the relevant documents. In another, one or more inputs are retrieved electronically through, for example, a secure connection to a financial institution holding and managing assets or liabilities for an estate planning client. In yet another embodiment, the balance sheet information is drawn automatically from industry-standard or proprietary electronic formats. Optionally, the interface provides additional action buttons, such as an action button to clear the balance sheet inputs 399 or portions thereof.

Figure 4:
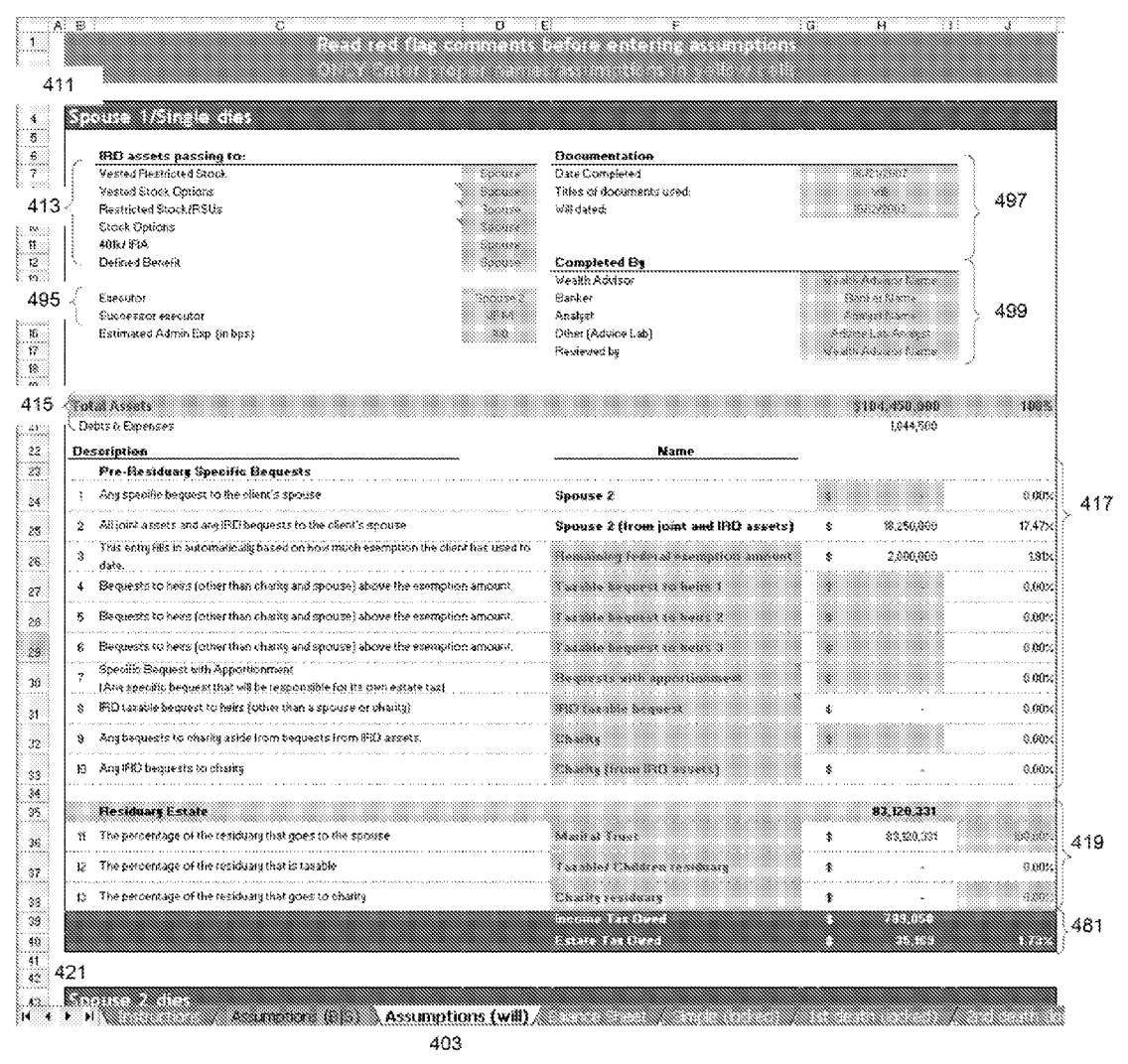

FIG. 4 illustrates a first estate document inputs interface according to a disclosed embodiment. Generally, the estate document information reflects which assets are to be transferred to a particular survivor or beneficiary, and in what amount. The illustrated interface provides estate document inputs corresponding to the death of the first spouse or single client 411 and, if applicable, the death of the second spouse 421. The estate document information may be drawn from a variety of estate planning documents, which can be referenced 497. The interface may also provide a space to denote the various participants in the estate disposition modeling process 499. Based on the estate documents, the identities of the executor, successor executor and estimated administration fees (for example, expressed as a percentage of the total assets or gross estate) may be input 495.

Turning to the illustrated example, the beneficiaries upon death of income in respect of a decedent (IRD) assets 413 may be designated in accordance with the instructions in the client's will or other estate documents. Total assets, as well as estimated debts and expenses 415 may also be reflected in this interface. In one embodiment, the estimated administration expenses are expressed in basis points (bps) of the value of the estate.

For each decedent, various pre-residuary specific bequests may be identified and input 417. Optionally, a change in name of listed category will flow through to the disposition output. In the illustrated example, the bequest to "Spouse 2" denotes a specific bequest to the clients spouse. "Spouse 2 (from IRD & joint assets)" reflects joint assets and any IRD bequests to the client's spouse. "Remaining federal exemption amount" is automatically generated based on how much exemption the client has used, but this figure can be changed. "Bequest 1", "Bequest 2", and "Bequest 3" reflect bequests to children above the exemption amount. "Bequests with apportionment" reflects a specific bequest that will be responsible for its own estate tax. "IRD taxable bequest" reflects an IRD bequest to anyone other than a spouse or charity. "Charity 1" reflects bequests to charity aside from bequests from IRD assets. "Charity (from IRD assets)" reflects IRD bequests to charity.

Additionally, the instructions from the estate documents regarding the residuary estate 419 may also be input. For example, the percentage of the residuary estate going to the spouse, that is taxable or that goes to charity is input. Although the illustrated example uses percentages in describing the apportionment of the pre-residuary specific bequests and the residuary estate, other embodiments use the actual values or other appropriate measure as units of input.

Based on the inputs, income, estate and other taxes are calculated for the particular scenario 481. Income tax can be triggered by IRD assets and optionally assumes a lump sum distribution. If the client is married, then similar inputs are entered in the case of the death of the client's spouse 421.

Estate document inputs may be retrieved from a variety of tangible or electronic records including, but not limited to, wills, codicils, revisions, amendments, revocable and irrevocable trusts, living trusts, assignments and other estate planning documents. In one embodiment, these inputs are entered into the estate documents input interface. In another, one or more estate document inputs is retrieved electronically through, for example, natural language processing or reading fields or tags in an electronic estate document format. For example, an algorithm can analyze the text of the will (for example, parsing various instructions or conveyances within the will using templates or masks to recognize common language structures contained in wills such as "I [conveyor] leave my car [asset to be conveyed] to my nephew [heir (apparent) or intended beneficiary].") to extract or approximate the conveyances contained therein. In yet another embodiment, the estate document inputs are drawn automatically from industry-standard or proprietary electronic formats.

Figure 5A:
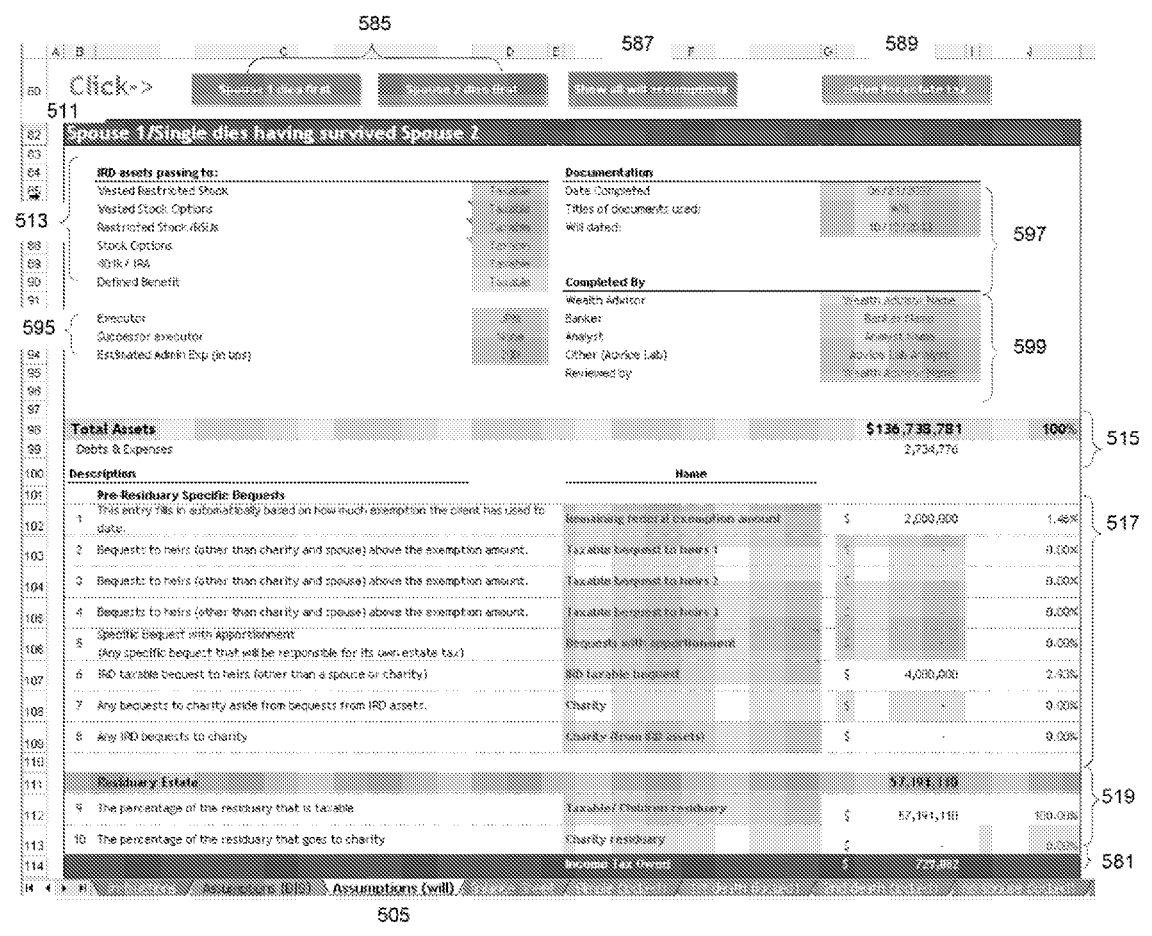

FIG. 5A illustrates a second estate document inputs interface according to a disclosed embodiment. As in the example illustrated in FIG. 4, the inputs are grouped according to a particular event or occurrence. Here, the inputs correspond to the contingency that the first spouse dies having survived the second spouse 511. Any number of events, scenarios or contingencies can be accommodated. For example, the illustrated example includes action buttons 585 to quickly select a scenario based on the event that one spouse dies before another. To facilitate more comprehensive understanding by a user, the second estate document input interface may also include an action button to show the estate planner or wealth advisor all the estate planning assumptions 587. Similar to the interface illustrated in FIG. 4, the pre-residuary specific bequests 517 and the instructions for the residuary estate 519 may be input.

The second estate document input interface also embodies taxation logic that corresponds to the appropriate or estimated level of taxation for each conveyance. For example, assets such as vested restricted stock, vested stock options, RSUs and stock options are considered income in respect of a decedent (IRD) and therefore subject to income tax upon the surviving spouse's death unless the assets are given to a charity 513. Based on the entered balance sheet and estate document inputs, the estate and other tax 581 are be calculated automatically or upon a prompt by a user 589.

The second estate document input interface further provides a view of the total assets at the time of the second event (death) 515. The estimated growth or contraction of assets and liabilities between the death of the first and second spouses (or other events) may be accomplished using one or more of a variety of known methods, including probabilistic modeling techniques disclosed in U.S. Pat. No. 7,031,935 to Chhabra et al., the entirety of which is incorporated by reference herewith. The number of years between significant events or estimated scenarios may be input by the estate planner or estimated based, for example, on the statistical life expectancies of the client and/or spouse.

FIG. 5B illustrates a graphical example of taxation logic according to a disclosed embodiment. The example illustrates some of the taxation logic involved in calculating the estate tax due upon the disposition of the estate after the first event (the death of the client "Spouse 1") 597 and the estate tax due upon disposition of the estate after the second event (the death of the client's spouse, Spouse 2, who had survived the client) 599. Upon the death of the client, distributions are made to the estate or marital trust 561. The estate tax is then calculated 565, taking into a variety of factors such as those shown. Although no federal estate tax is due at this stage, state estate tax is still due 565. Similar steps 571, 573 provide estimates of the federal and state estate taxes due after the second event, such as the death of the surviving spouse. As illustrated here, a large amount of estate tax becomes due upon the death of the surviving spouse 575.

Figure 6:
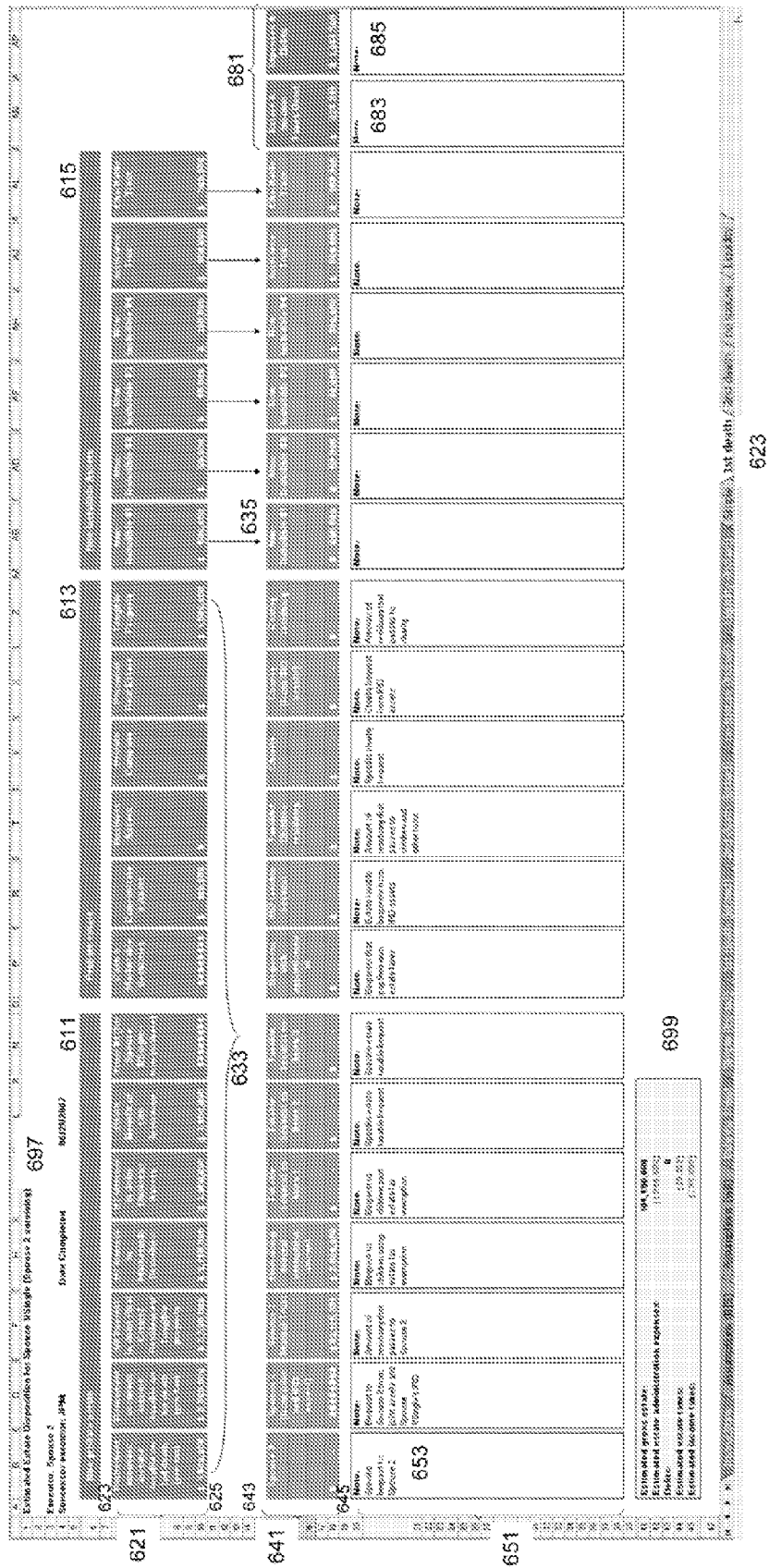
FIG. 6 illustrates a default first-event disposition flowchart according to a disclosed embodiment.

FIG. 6 illustrates a default first-event conveyance flowchart according to a disclosed embodiment. This flowchart corresponds to the estate disposition after the first event (such as the death of the first spouse) 697. The first event can be configured to occur at any time, including a future date. As described elsewhere, the timing of the first event (and any subsequent events) may impact the outcome of the application of the taxation logic. In one embodiment, this default flowchart is populated with fields and symbols corresponding to the balance sheet and estate documents, but leaves the task of denoting specific conveyances to the estate planner. In this illustrated example, the components of the estate are grouped into the non-probate estate 611, the probate estate 613 and the non-includable assets 615. The initial allocation of assets (for example, this row denotes what the client currently or initially has) is denoted on the top row 621, with each asset or asset category including a textual description 623 and value or holdings 625 corresponding to the balance sheet entry. Editable connectors 633, 635 to denote bequests or conveyances are pre-populated in the illustrated example. The second row 641 illustrates the estate disposition after the first event or death (for example, this row denotes "who is getting what"). In one embodiment, the various components or rows may be color coded for easy understanding. The details of the estate after the first event 643, 645 result from applying the conveyance logic from the first estate document input interface (FIG. 4) to the initial allocation of assets or asset categories in the balance sheet. Space for annotation of the various components of the estate 651 may be provided. These spaces for annotations may also include links or references, such as hyperlinks, to the corresponding portion of the estate planning document from which this conveyance was drawn. In the illustrated example, the notes 653 correspond to the bequests input in the second estate document input interface (FIG. 5A). Further, estate liabilities are also reflected 681 upon the occurrence of the first event. For example, the chart shows the estate and income taxes owed by the surviving spouse's estate 683, as well as expenses and debts 685 to be paid out of the estate. These liabilities 681 may also optionally be color-coded to enhance the user's understanding of the flowchart.

Based on the tax and other logic as applied to the balance sheet and estate document inputs, the gross estate, estate administration expenses, debts, estate taxes and income taxes due by the estate after the first event are estimated and summarized 699.

Figure 7:
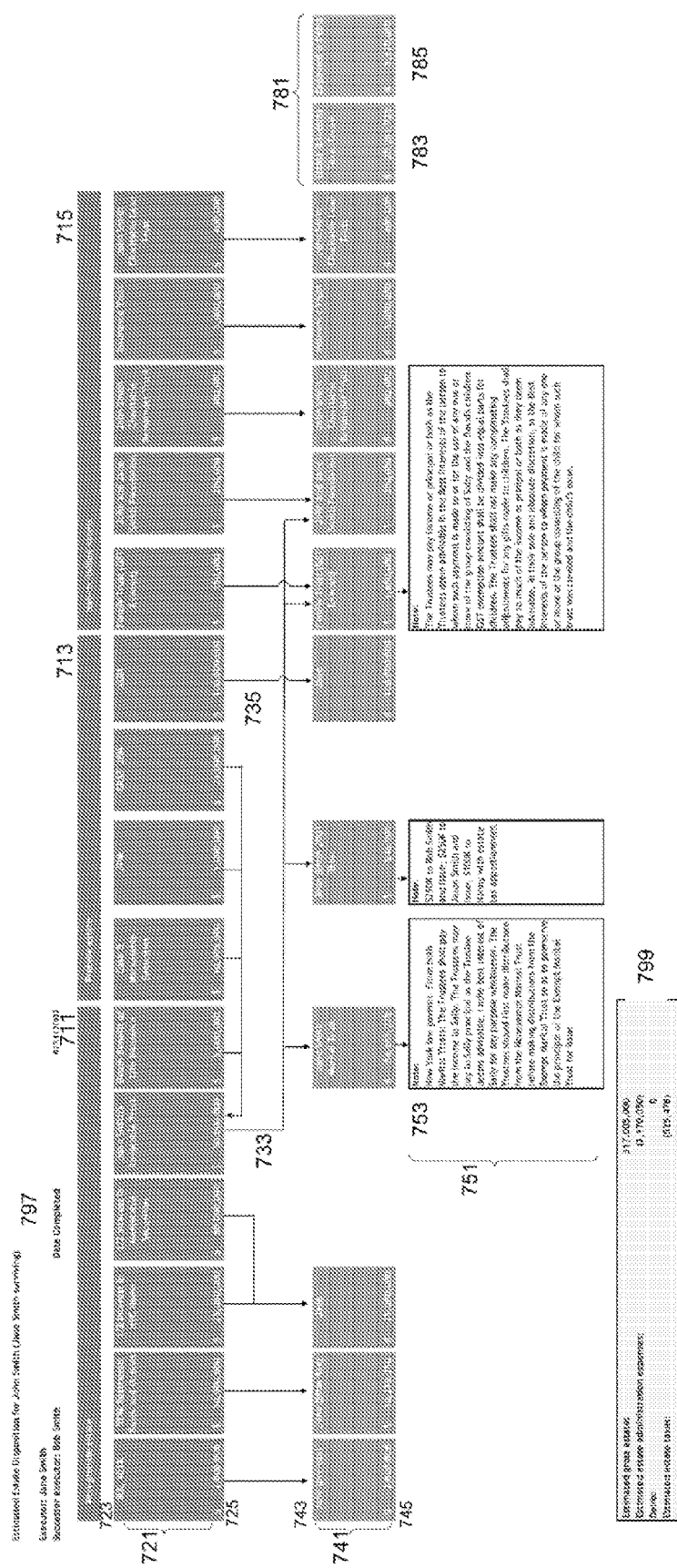
FIG. 7 illustrates a customized first-event disposition flowchart according to a disclosed embodiment.

FIG. 7 illustrates a customized first-event disposition flowchart according to a disclosed embodiment. In one embodiment, the customized disposition flowchart, entitled "Estimated Estate Disposition for John Smith (Jane Smith surviving)" 797, is customized manually by an estate planner or wealth advisor. For example, the various estate components may be split or combined to correspond exactly to the specific asset entries in the balance sheet. In another embodiment, this customized flowchart is generated automatically in accordance with the previously received conveyance logic from the estate documents. For example, the connecting arrows denoting conveyances of assets or liabilities are generated automatically.

In the illustrated example, components 721 of the original estate of John Smith (including non-probate estate 711, probate estate 713 and non-includable assets 715) are customized to have text identifiers 723 and values 725 corresponding to the specific assets included on the balance sheet. Components 741 of the disposed estate are similarly customized. Additionally, several note fields 751 now contain excerpts, references or links 753 from the estate document, such as a will or trust, that governs that conveyance. The chart also shows liabilities 781 including the estate and income taxes owed by the surviving spouse's estate 783, as well as expenses and debts 785 to be paid out of the estate. Gross estate, estate administration expenses, debts, estate taxes and income taxes due by the estate after the first event are also still estimated and summarized 799.

Figure 8:
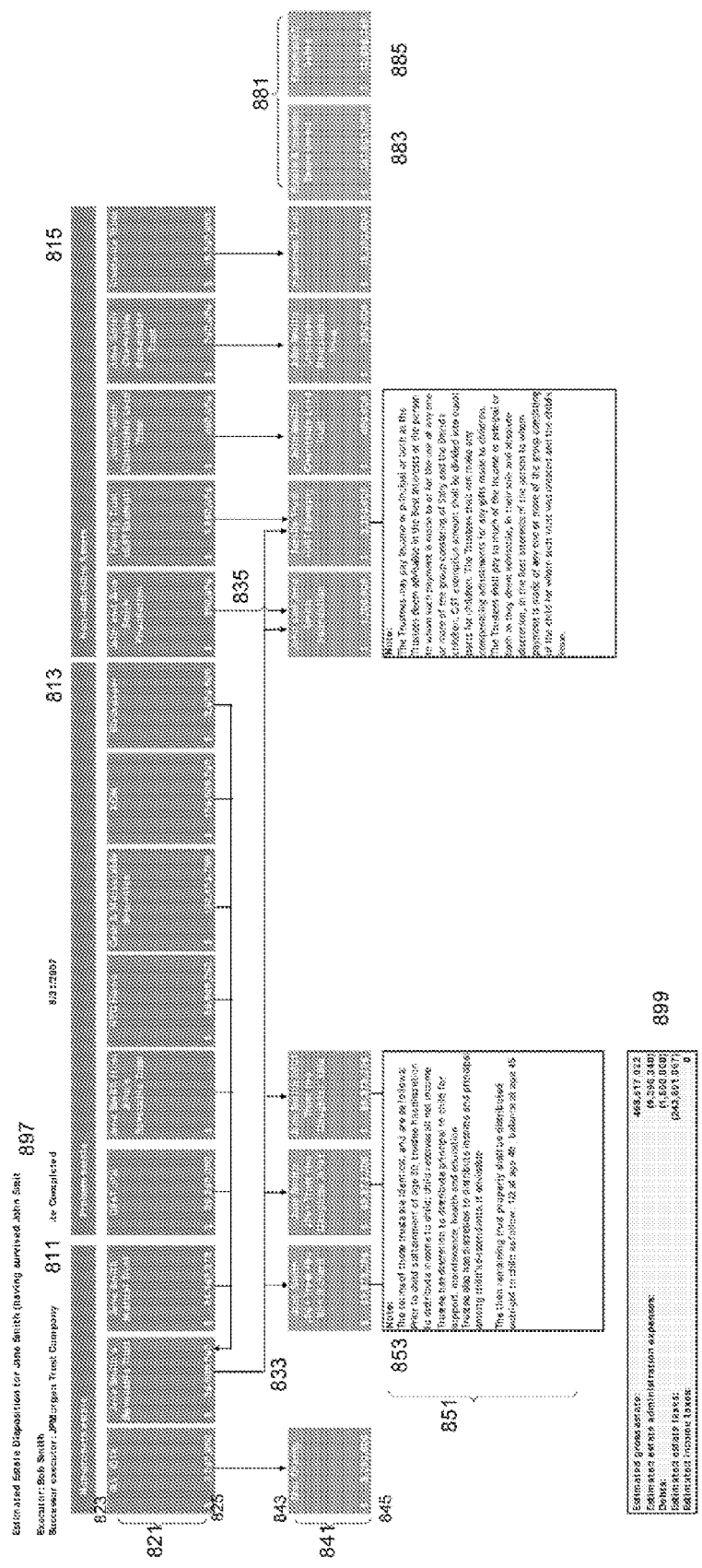
FIG. 8 illustrates a customized second-event disposition flowchart according a disclosed embodiment.

FIG. 8 illustrates a customized second-event disposition flowchart according a disclosed embodiment. In the illustrated example, the chart is entitled "Estimated Estate Disposition for Jane Smith (having survived John Smith)" 897. The disposition of the estate after the second event corresponds to the inputs of the second estate document inputs interface (FIG. 5). The second event may be designated by the estate planner to be coincident with or after the first event. In the illustrated example, the second event corresponds to a time when a surviving spouse dies. In other embodiments, additional events (for instance, a third event corresponding to the death of a child beneficiary of the original estate client) may optionally be modeled to provide a multi-generational view of the estate plan. In one embodiment, third and subsequent event models account for generation skipping tax (GST) implications. Similar to the case of the first-event disposition flowchart, the customized second-event disposition flowchart may be customized by an estate planner or automatically generated based on the conveyance logic.

In the illustrated example, components 821 of the estate held by the surviving spouse, Jane Smith (including non-probate estate 811, probate estate 813 and non-includable assets 815) are customized to have text identifiers 823 and values 825 corresponding to the specific assets included on the balance sheet and estimated based upon the first event (for instance, the prior death of John Smith). Components 841 of the disposed estate are similarly customized. Additionally, several note fields 851 contain excerpts, references or links 853 from the estate document, such as a will or trust, that governs that conveyance. The chart also shows liabilities 881 including the estate and income taxes owed by the surviving spouse's estate 883, as well as expenses and debts 885 to be paid out of the estate. Gross estate, estate administration expenses, debts, estate taxes and income taxes due by the estate after the first event are also still estimated and summarized 899.

Figure 9:
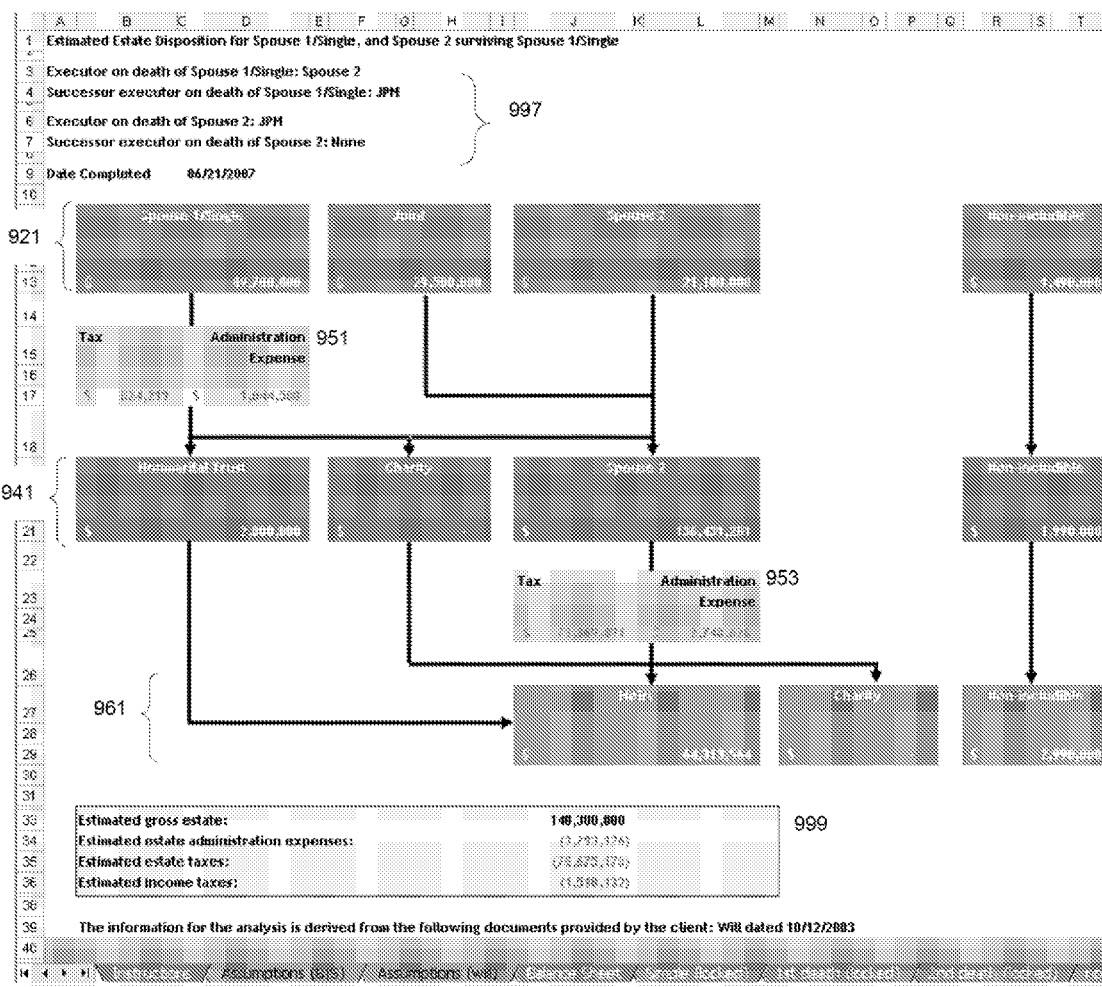
FIG. 9 illustrates a combined disposition flowchart according to a disclosed embodiment.

FIG. 9 illustrates a combined disposition flowchart according to a disclosed embodiment. Depending on the level of complexity of the estate or the needs of the client, a simpler illustration of the estate plan may be desirable. Accordingly, the embodiment illustrated in FIG. 9 provides a combined disposition flowchart which shows the transfer of assets and calculates taxes and expenses for multiple events in a convenient, integrated view.

Instead of generating separate disposition flowcharts for each event as illustrated in FIGS. 7 and 8, the combined disposition flowchart simultaneously reflects the original estate 921, the estate disposition after the first event 941, and the estate disposition after the second event 961. Taxes and administration expenses incurred after each event 951, 953 are also reflected in-line with the estate components. The combined disposition flowchart view provides a summary of the events being modeled 997 and the estimated expenses and taxes due after the second event 999.

Figure 10:
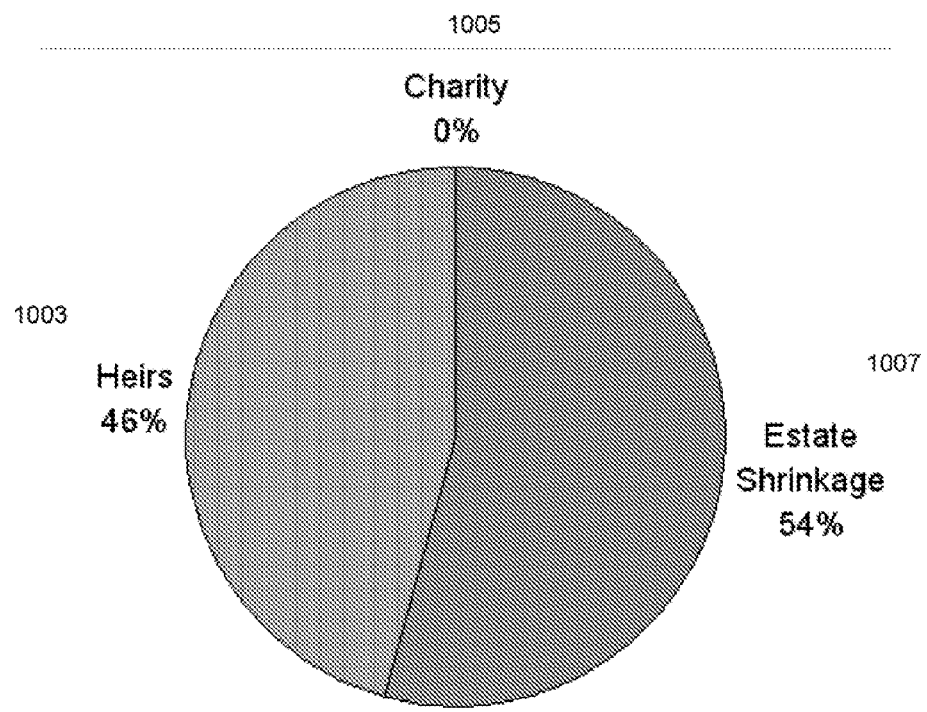
FIG. 10 illustrates an estate shrinkage pie chart according to a disclosed embodiment.

FIG. 10 illustrates an estate shrinkage pie chart according to a disclosed embodiment. This intuitive chart may also be desirable to provide the planner or client with a succinct visual representation of the proportion of the client's estate that eventually reaches his or her intended beneficiaries or charities. In particular, it may be desirable to graphically depict the shrinkage 1007 of the gross estate due to taxes and expenses. The balance successfully bequeathed to heirs 1003 and charity 1005 are also reflected.

FIG. 11A illustrates a first liquidity status output according to a disclosed embodiment. FIG. 11B illustrates a second liquidity status output according to a disclosed embodiment. As described above, large estates are particularly susceptible to liquidity deficits upon disposition because of the high rates of estate, gift and income taxation applied to the conveyed assets. Generally, a liquidity deficit 1101, 1102 arises when the combined cash requirements 1103, 1104 of both estates (for example, after two events or the deaths of both spouses occur) exceeds the combined liquidity 1105, 1106 of the estates. In the illustrated example, the cash requirements 1103, 1104 include administration expenses, debts, estate taxes and income taxes 1111, 1112. The sum of these components is the total cash required by the estate upon final disposition 1113, 1114. In the illustrated example, the combined liquidity 1105, 1106 takes into account assets such as cash, marketable securities, concentrated assets, RSUs, life insurance and qualified assets 1121, 1122. The sum of these components is the total liquidity that the estate has on hand 1123, 1124. Optionally, these components 1111, 1121 may take into other factors 1197, 1198 such as account income taxes payable upon exercise of options and distribution of qualified assets or stock options (depending on whether an executor exercises the options immediately or chooses to delay until expiration). Although the combined liquidity of the estate in FIG. 11B is much larger than that of the estate in FIG. 11A, in both situations, the cash required exceeds the cash available, resulting in an estimated liquidity deficit 1101, 1102.

Figure 12:
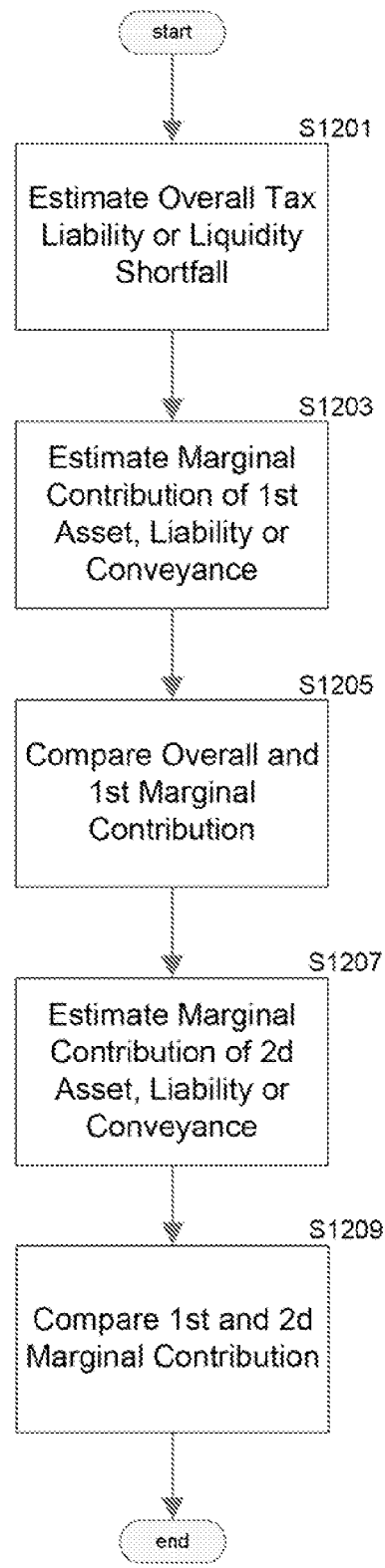
FIG. 12 illustrates an exemplary output feature of the disclosed model related to analyzing a marginal tax contribution of an asset, liability or conveyance.

FIG. 12 illustrates an exemplary output feature of the disclosed model related to analyzing a marginal tax contribution of an asset, liability or conveyance. In the illustrated embodiment, the overall tax liability for the estate or liquidity shortfall is estimated S1201. The marginal contribution of a particular asset, liability or conveyance to the estate's overall estate, income or tax liability or liquidity shortfall is also estimated S1203. For example, the conveyance of an asset such as an antique automobile to a child upon the client's death may require the payment of a certain amount of taxes related to the value of the asset being conveyed. This estimated marginal tax contribution is then compared to the overall tax liability for the estate at the time of the conveyance S1205. This comparison may be expressed, for example, as a percentage of the total estate tax liability. In an additional embodiment, the marginal contribution of another asset, liability or conveyance is estimated S1207 and compared to the first S1209.

In another embodiment, the marginal contributions of each asset, liability or conveyance in the estate plan is estimated and represented, for example, as a list or a pie chart. By estimating the marginal contribution of certain aspects of the client's current estate plan, the client or wealth advisor may advantageously identify particular assets, liabilities and conveyances which significantly impact the financial health of the estate upon an intermediate or final disposition. The marginal contribution may optionally be further depicted in the context of the corresponding flow charts and liquidity analysis outputs as described elsewhere.

Figure 13:
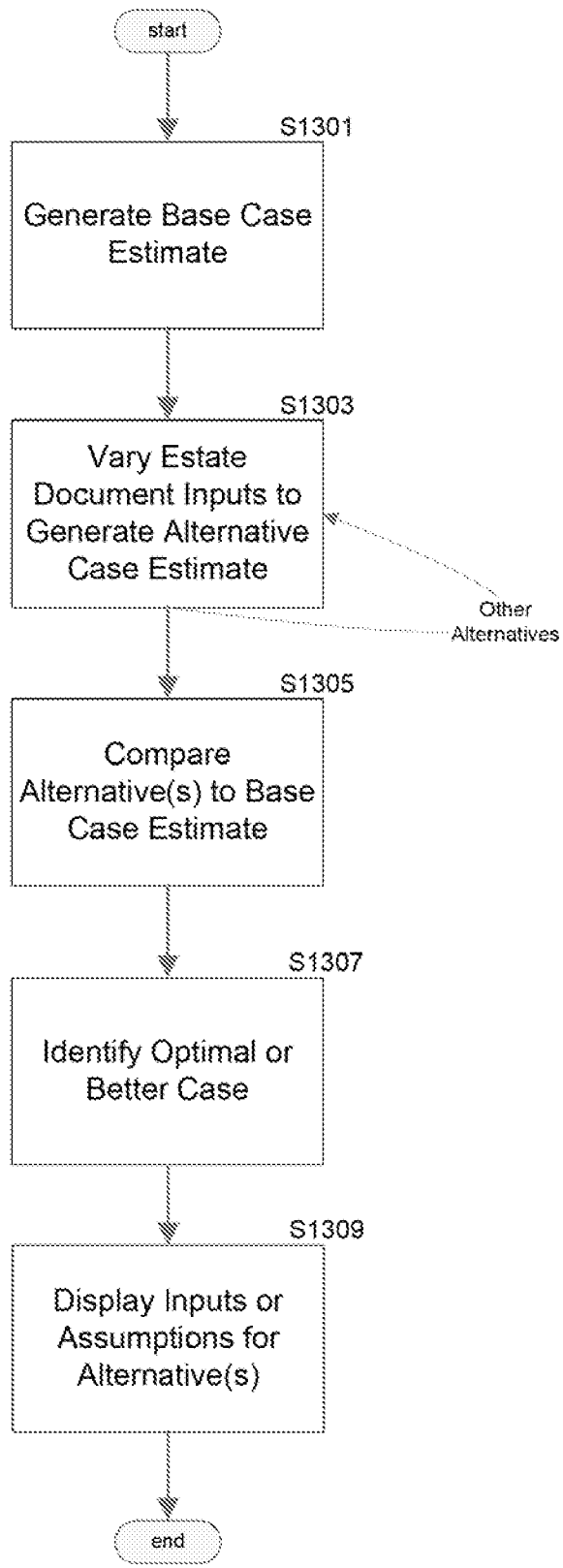
FIG. 13 illustrates an exemplary output feature of the disclosed model related to generating alternative estate planning strategies.

FIG. 13 illustrates an exemplary output feature of the disclosed model related to generating alternative estate planning strategies. In one embodiment, the model generates a base case for the estate disposition tax and liquidity estimates S1301. Then, by varying one or more estate planning inputs, alternative gifting and trust strategies are input to generate alternative estate disposition and liquidity estimates S1303. Based on a comparison between the generated base and alternative estimates S1305, the model identifies one or more of the alternatives which may result in reduced taxation or greater financial health for the estate S1307. In certain instances, the current or base case may be better than the generated alternatives. Additionally, the model displays or otherwise allows access to the various inputs or assumptions on which one or more of these alternatives is based S1309. In one embodiment, the display compares the inputs or assumptions for the alternative case with the base case or among the generated alternative cases.

In one example, the model iteratively implements if-then calculations to determine better assets to gift or convey. For instance, the model may determine that gifting certain IRD assets to charity instead of a gift of other cash/securities may eventually provide a tax advantage over other alternatives. In another example, the alternative estimates are generated to identify better conveyances or estate features to implement in the estate plan. For instance, the model's analysis may determine that establishing an irrevocable trust to hold a particular taxable asset for an ultimate beneficiary allows for tax savings upon disposition of the estate. The impact of these alternative strategies may optionally be further depicted in corresponding flow charts and liquidity analysis outputs as described elsewhere.

Figure 14:
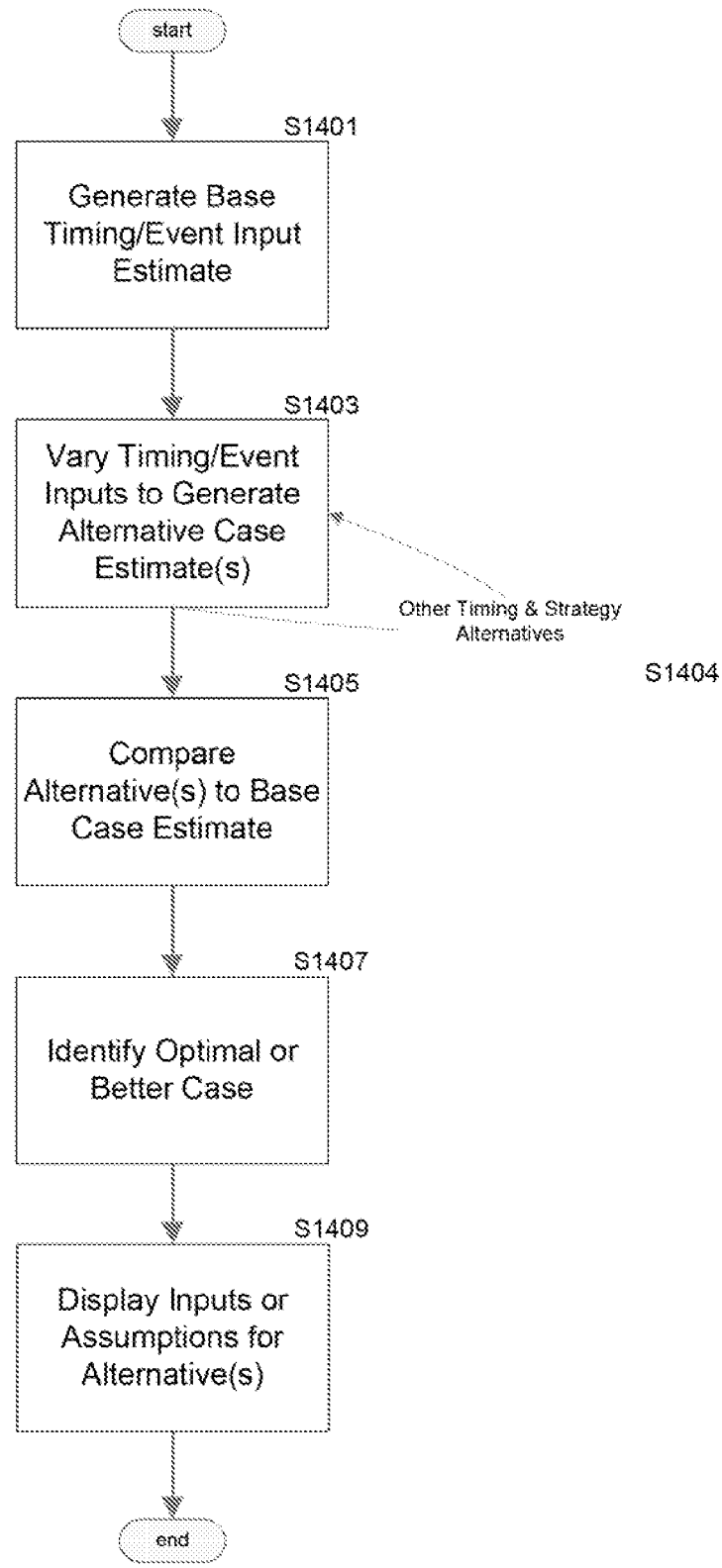
FIG. 14 illustrates an exemplary output feature of the disclosed model related to simulating alternative events or circumstances.

FIG. 14 illustrates an exemplary output feature of the disclosed model related to simulating alternative events or circumstances. In one embodiment, the model presents the option to vary the year of death to reflect the different tax rules projected to be applicable in the future. For example, the timing of the death of the client may vary and directly impact the projected estate disposition analysis. Additionally, the timing of the death of the client's spouse, or the relative time between the spouses' deaths also may impact the analysis. In the illustrated embodiment, the model generates a base case for the estate disposition tax and liquidity estimates based on a first set of timing or event inputs S1401. For example, the base case may run the model as if the client dies that day or in the current year. Other inputs may be the delayed death of the client and/or spouse, as well as the relative time between these deaths. Then, by varying one or more timing or event inputs (for example, illustrated schematically at 151 of FIG. 1), alternative estate disposition and liquidity estimates are generated S1403. For example, a second iteration may run the model as if the client dies in 10 years and account for the potential growth in the estate before the client's death. This estimated growth may be estimated in a variety of methods, including but not limited to, a fixed rate of growth, an asset based rate, an actual rate, the method described in U.S. Pat. No. 7,031,935 to Chhabra et al. described above, or another suitable method.

In another embodiment, additional iterations may also account for different estate planning strategies (described elsewhere, for example, at FIG. 13) as well as different timing or event inputs S1404. For example, a third iteration based on the client dying in 10 years illustrates the potential impact on the estate of implementing one or more estate planning strategies before death, such as today. In this example, the model allows for a comparison of doing nothing and planning with various strategies today. Based on a comparison among the various generated alternatives S1405, an optimal or better scenario based on the timing/event or other inputs may be identified S1407. Optionally, the inputs or assumptions relied upon in generating the alternative scenarios may be displayed S1409. In another embodiment, the model receives inputs related to factors affecting the life expectancy of the client and/or spouse (for example, health problems, smoking and drinking habits, etc.) to probabilistically estimate, using actuarial or other suitable methods, the likely timing inputs and resultant disposition of the estate given a certain estate plan strategy. Further, the model optionally provides a probabilistic comparison between the alternative scenarios based on life expectancy, asset growth estimates and other probabilistic inputs. For example, the model may estimate that there is a 35% chance of a liquidity shortfall greater than $1 million dollars in the base scenario, but only a 8% chance in an alternative scenario where the timing of the events/deaths was different or the client implemented a different estate planning strategy.

These alternative timing or event input scenarios may optionally be further depicted in corresponding flow charts and liquidity analysis outputs as described elsewhere. Additional embodiments may also implement a portion or combination of the various analyses and simulations described in FIGS. 12-14 to advantageously provide a wide spectrum of estate plan estimates under a variety of different circumstances involving a confluence of factors such as event timing, asset and liability allocation, and conveyance instructions.

Figure 15:
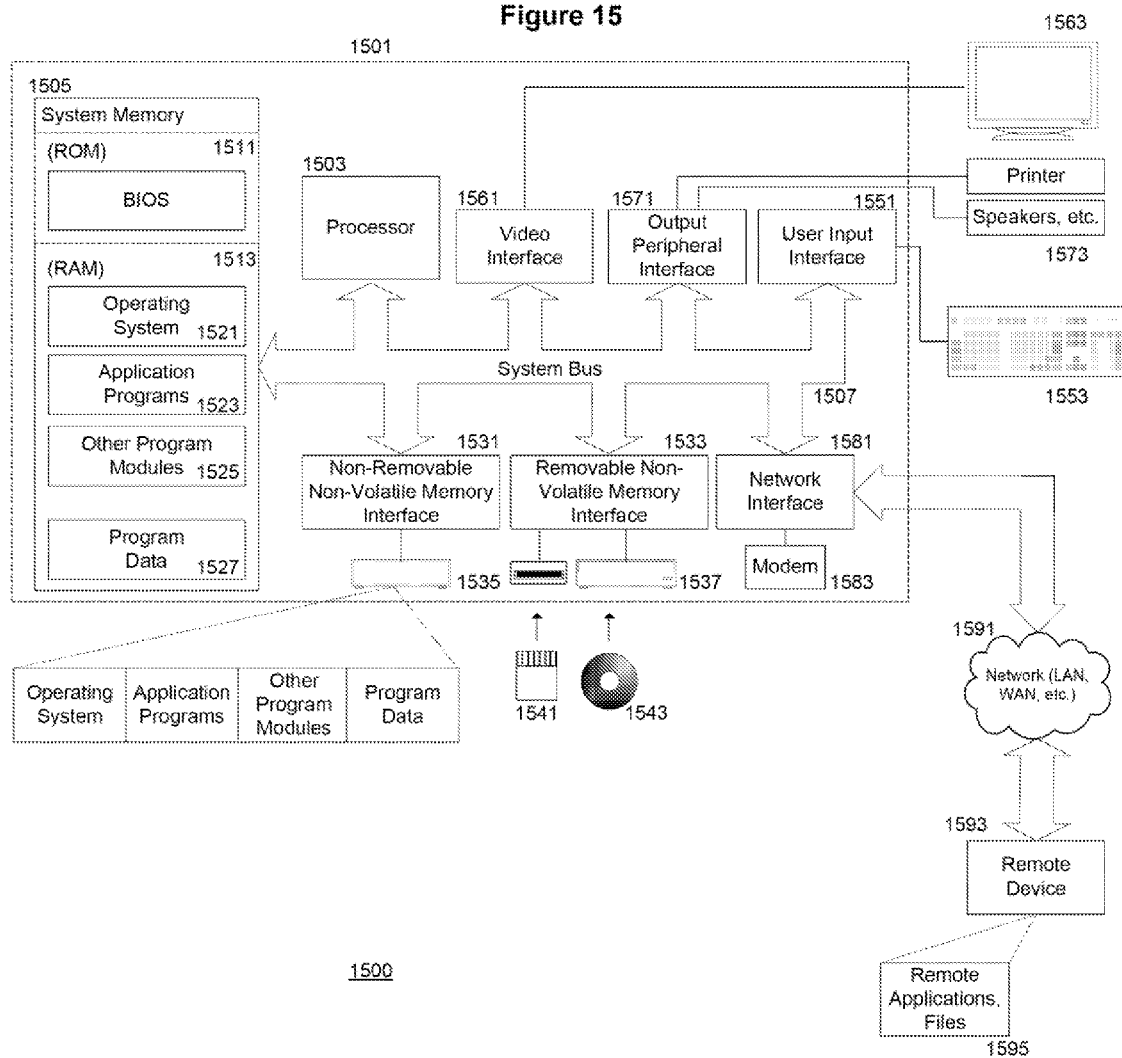
FIG. 15 is a schematic diagram of an exemplary computing system environment for use in implementing one or more of the disclosed embodiments.

FIG. 15 is a schematic diagram of an exemplary computing system environment 1500 for use in implementing one or more of the disclosed embodiments. As understood by those of ordinary skill in the art, the various embodiments disclosed herein may be implemented by or include a computer or computers. Disclosed embodiments may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the disclosed embodiments may be practiced with various computer system configurations, including hand-held wireless devices such as mobile phones or PDAs, multiprocessor systems, microprocessor-based or programmable consumer electronics, minicomputers, mainframe computers, and the like. The embodiment may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer 1501 including a processing unit 1503, a system memory 1505, and a system bus 1507 that couples various system components including the system memory to the processing unit.

Computers typically include a variety of computer readable media that can form part of the system memory and be read by the processing unit. By way of example, and not limitation, computer readable media may include computer storage media and communication media. The system memory 1505 may include computer storage media in the form of volatile and/or nonvolatile memory such as read only memory (ROM) 1511 and random access memory (RAM) 1513. A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system 1521, application programs 1523, other program modules 1525, and program data 1527. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

The memory includes at least one set of instructions that is either permanently or temporarily stored. The processor 1503 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The embodiments may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the embodiment. Illustratively, the programming language used may include assembly language, Ada, APL, Basic, C, C++, C#, COBOL, dBase, Forth, FORTRAN, Java, Modula-2, Pascal, Prolog, REXX, Java and/or JavaScript, for example. In one embodiment, the estate disposition model is implemented using a macro- or script-enabled spreadsheet such as Microsoft Excel with Visual Basic. In another embodiment, the model is implemented in Java, C, C# or a stand-alone compiled application as is known in the art of software design. In yet another embodiment, the model is provided as a web-based application. Further, it is not necessary that a single type of instruction or programming language be utilized in conjunction with the operation of the system and method of the embodiment. Rather, any number of different programming languages may be utilized as is necessary or desirable.

Also, the instructions and/or data used in the practice of the embodiment may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive 1535 may read or write to nonremovable, nonvolatile magnetic media. A magnetic disk drive may read from or writes to a removable, nonvolatile magnetic disk, a flash memory reader may read from a flash storage medium 1541, and an optical disk drive 1537 may read from or write to a removable, nonvolatile optical disk 1543 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface 1531, 1533.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the embodiment.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices 1553 such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface 1551 that is coupled to the system bus, but may be connected by other interface and bus structures, such as a parallel port, game port or a universal serial bus (USB).

One or more monitors or display devices 1563 may also be connected to the system bus via an interface 1561. In addition to display devices, computers may also include other peripheral output devices 1573, which may be connected through an output peripheral interface 1571. The computers implementing a disclosed embodiment may operate in a networked environment 1591 using logical connections to one or more remote computers, servers, databases or other remote devices 1593, the remote devices typically including some 1595 or all of the elements described above.

Various networks may be implemented in accordance with various embodiments, including a wired or wireless local area network (LAN) and a wide area network (WAN), wireless personal area network (PAN) and other types of networks.

When used in a LAN networking environment, computers may be connected to the LAN through a network interface or adapter 1581. When used in a WAN networking environment, computers typically include a modem 1583 or other communication mechanism. Modems may be internal or external, wired or wireless, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, the various components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the embodiments described herein.

Various disclosed embodiments advantageously allow for a user, such as a wealth advisor or estate planner, to efficiently and easily customize visual representations of the disposition of a client's estate based on various customizable circumstances. Further, disclosed embodiments allow the client to view the allocation or distribution of their assets and liabilities in their estate plan at a given time and under a variety of simulated circumstances.

Various embodiments also provide estate planners, wealth advisors and clients with customizable and annotatable flowcharts illustrating future dispositions of the estate that adjust automatically to changes in a client's balance sheet and estate plan. Further, detecting and estimating a potential liquidity shortfall and other issues upon disposition of the estate at a future time provides a client with an opportunity to prepare for or adjust the estate plan accordingly, thereby avoiding or reducing the likelihood of such a potentially disastrous outcome for the client's heirs and beneficiaries.

While multiple embodiments have been shown and described, various modifications may be made by one of ordinary skill in the art without departing from the scope of the present disclosure, the following claims and their equivalents.

The invention claimed is:

1. A computer-implemented method for modeling a disposition of an estate, the method comprising:
   receiving, at a user interface to a computer, balance sheet inputs for a first individual, the balance sheet inputs including an asset and asset value information;
   receiving, at a user interface to a computer, an indication of a first conveyance event;
   receiving, at a user interface to a computer, first estate document inputs for the first individual, the estate document inputs including a first conveyance instruction associating the asset and a first beneficiary, the first conveyance instruction corresponding to the first conveyance event;
   estimating, using a processor, a first tax liability value associated with the asset, the first tax liability corresponding to the first conveyance instruction and the first conveyance event;
   comparing the first tax liability value to the asset value information to generate a liquidity analysis report corresponding to the first conveyance event;
   generating, using a computer, a first flowchart corresponding to the first conveyance event, the first flowchart visually representing the first conveyance instruction;
   generating an alternate conveyance instruction;
   estimating an alternate tax liability value corresponding to the alternate conveyance instruction and an alternate conveyance event; and
   comparing the alternate tax liability value and the first tax liability value to identify a preferred conveyance instruction.

2. The method of claim 1, further comprising:
generating the alternate conveyance event.

3. A computer-implemented method for modeling a disposition of an estate, the method comprising:
   receiving, at a user interface to a computer, balance sheet inputs for a first individual, the balance sheet inputs including an asset and asset value information;
   receiving, at a user interface to a computer, an indication of a first conveyance event;
   receiving, at a user interface to a computer, first estate document inputs for the first individual, the estate document inputs including a first conveyance instruction associating the asset and a first beneficiary, the first conveyance instruction corresponding to the first conveyance event;
   estimating, using a processor, a first tax liability value associated with the asset, the first tax liability corresponding to the first conveyance instruction and the first conveyance event;
   comparing the first tax liability value to the asset value information to generate a liquidity analysis report corresponding to the first conveyance event;
   generating, using a computer, a first flowchart corresponding to the first conveyance event, the first flowchart visually representing the first conveyance instruction, wherein the first flowchart includes customizable graphics and text fields.

4. The method of claim 3, wherein the first flowchart includes annotations for linking a representation of a conveyed asset with a corresponding portion of an estate planning document.

* * * * *